United States Patent
Levine et al.

(10) Patent No.: US 9,935,921 B2
(45) Date of Patent: Apr. 3, 2018

(54) CORRELATING NAMESERVER IPV6 AND IPV4 ADDRESSES

(71) Applicant: Akamai Technologies, Inc., Cambridge, MA (US)

(72) Inventors: Matthew S. Levine, Brookline, MA (US); James M. Kretchmar, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 15/496,324

(22) Filed: Apr. 25, 2017

(65) Prior Publication Data

US 2017/0230331 A1 Aug. 10, 2017

Related U.S. Application Data

(63) Continuation of application No. 14/929,261, filed on Oct. 31, 2015, now Pat. No. 9,634,986, which is a
(Continued)

(51) Int. Cl.
*G06F 15/16* (2006.01)
*H04L 29/12* (2006.01)
(Continued)

(52) U.S. Cl.
CPC ...... *H04L 61/6009* (2013.01); *H04L 61/1511* (2013.01); *H04L 61/251* (2013.01);
(Continued)

(58) Field of Classification Search
CPC ............. H04L 67/2885; H04L 67/2842; H04L 67/251
See application file for complete search history.

(56) References Cited

U.S. PATENT DOCUMENTS 5,924,116 A * 7/1999 Aggarwal ......... G06F 17/30902
707/E17.12
5,991,810 A * 11/1999 Shapiro ................... G06F 21/31
707/999.001

(Continued)

*Primary Examiner* — Richard G Keehn
(74) *Attorney, Agent, or Firm* — David H. Judson

(57) ABSTRACT

Nameserver addresses are correlated in a multi-tier name server hierarchy comprising a first level authority for a domain, and one or more second level authorities to which the first level authority delegates with respect to a particular sub-domain associated with the domain. Preferably, the first level authority is IPv4-based and at least one second level authority is IPv6-based. The first level authority responds to a request issued by a client caching nameserver (a "CCNS") and returns an answer that includes both IPv4 and IPv6 authorities for the domain. The CCNS is located at an IPv4 source address that is passed along to the first level authority with the CCNS request. The first level authority encodes the CCNS IPv4 source address in the IPv6 destination address of at least one IPv6 authority. Then, when the CCNS then makes a follow-on IPv6 request (with respect to the sub-domain) directed to the IPv6 authority, the IPv6 authority knows both the IPv6 address of the CCNS (as well as its IPv4 address. The IPv6 authority maintains the IPv4-IPv6 correlation. Over time, the IPv6 authority builds up a database of these CCNS IPv6-IPv4 associations.

11 Claims, 3 Drawing Sheets

Related U.S. Application Data continuation of application No. 12/857,222, filed on Aug. 16, 2010, now Pat. No. 9,178,749.

(60) Provisional application No. 61/234,266, filed on Aug. 15, 2009, provisional application No. 61/234,037, filed on Aug. 14, 2009.

(51) Int. Cl.
　　*H04L 29/08*　　　(2006.01)
　　*H04L 29/06*　　　(2006.01)

(52) U.S. Cl.
　　CPC ...... *H04L 61/2514* (2013.01); *H04L 67/2842* (2013.01); *H04L 67/2885* (2013.01); *H04L 69/167* (2013.01)

(56) References Cited

U.S. PATENT DOCUMENTS

| | | | | |
|---|---|---|---|---|
| 7,660,950 B2* | 2/2010 | Miller | G06F 17/30902 | 711/133 |
| 8,028,056 B1* | 9/2011 | Krishna | G06F 17/30902 | 709/223 |
| 8,489,820 B1* | 7/2013 | Ellard | | 711/120 |
| 2003/0179742 A1* | 9/2003 | Ogier | H04W 1/1614 | 370/351 |
| 2003/0187882 A1* | 10/2003 | Jinmei | H04L 29/1216 | |
| 2004/0010562 A1* | 1/2004 | Itonaga | H04L 12/4645 | 709/213 |
| 2004/0143579 A1* | 7/2004 | Nakazawa | H04L 29/12066 | |
| 2004/0236726 A1* | 11/2004 | Ewing | G06F 17/3048 | |
| 2006/0146816 A1* | 7/2006 | Jain | H04L 63/1408 | 370/389 |
| 2008/0069137 A1* | 3/2008 | Jimmei | H04L 12/66 | 370/466 |
| 2010/0142447 A1* | 6/2010 | Schlicht | H04W 4/20 | 370/328 |
| 2010/0217890 A1* | 8/2010 | Nice | H04L 29/12066 | 709/245 |
| 2011/0090906 A1* | 4/2011 | Arkko | H04L 29/12801 | 370/392 |
| 2011/0131341 A1* | 6/2011 | Yoo | G06F 17/30902 | 709/237 |
| 2011/0137888 A1* | 6/2011 | Yoo | G06F 17/30902 | 707/713 |
| 2011/0310898 A1* | 12/2011 | Alkhatib | H04L 29/12358 | 370/392 |

* cited by examiner

CORRELATING NAMESERVER IPV6 AND IPV4 ADDRESSES

BACKGROUND

Technical Field

This application relates generally to Internet addressing.

Brief Description of the Related Art

Internet resources are located using so-called Internet Protocol (IP) addresses. Internet Protocol v4 (IPv4) is the current Internet addressing scheme. The world, however, is running out of v4 IP addresses as reported by the service organizations that maintain them. In particular, IANA has reported that it will be out of IPv4 addresses to allocate as of July 2011, and ARIN, RIPE and APNIC report that they will be out of addresses to hand out as of April 2012. Moreover, before the addresses run out completely, they will become expensive to obtain.

The next generation Internet addressing scheme is IPv6. A key feature of IPv6 is that IP addresses are 128 bits long, as opposed to the 32 bits that are used for IPv4 addresses. This is a substantial increase in address length. IPv6 addresses generally are written as eight groups of four-digit hexadecimal numbers. Further information about IPv6 addresses is available in Internet Request for Comment (RFC) 4291. Domain name service (DNS) extensions to support IPv6 are described in RFC 3596.

Distributed computer systems are well-known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS query handling, provisioning, data monitoring and reporting, content targeting, personalization, and business intelligence.

BRIEF SUMMARY

According to an embodiment of this disclosure, a method of correlating nameserver addresses is implemented in a multi-tier name server hierarchy comprising a first level authority (typically a nameserver) for a domain, and one or more second level authorities (typically, each a nameserver) to which the first level authority delegates with respect to a particular sub-domain associated with the domain. Preferably, the first level authority is IPv4-based and at least one second level authority is IPv6-based. The first level authority responds to a request issued by a client caching nameserver (a "CCNS") and returns an answer that includes both IPv4 and IPv6 authorities for the domain. The CCNS is located at an IPv4 source address that is passed along to the first level authority with the CCNS request. According to a feature of this disclosure, the first level authority encodes the CCNS IPv4 source address in the IPv6 destination address of at least one IPv6 authority. Then, when the CCNS then makes a follow-on IPv6 request (with respect to the sub-domain) directed to the IPv6 authority, the IPv6 authority knows both the IPv6 address of the CCNS (by virtue of having received it in association with the request) as well as its IPv4 address (by virtue of the encoding). The IPv6 authority maintains the IPv4-IPv6 correlation. Over time (i.e., as other CCNSs make requests), the IPv6 authority builds up a database of these CCNS IPv6-IPv4 associations.

Following a complete DNS resolution of the sub-domain, typically a machine (e.g., a content server) is identified at some IPv6 destination address. When a requesting client (also operating via IPv6) then makes a content request to that machine IP address, that content request has associated therewith both (i) a source IP address of the requesting client; as well as (ii) an IPv6 destination address. As a result of the above-described technique, the destination address is an IPv6 address that encodes an IPv4 address of a client caching nameserver (CCNS) from which the requesting client obtained (originally from the first level authority) the destination address. If desired, the content server then associates the source IP address of the requesting client with the IPv4 address of the CCNS.

Without limitation, the IPv4 source address may be encoded into the IPv6 address in one of several ways, such as by placing the 32 bit IPv4 address unmodified in the lowest 32 bits of the IPv6 address, by encrypting the IPv4 address in the low-order bits of the IPv6 address (using as many bits as desired), by cryptographically hashing the IPv4 address into the low-order bits of the IPv6 address (using as many bits as desired), or in any other convenient manner. Regardless of whether the IPv4 address is unmodified, encrypted or hashed, the IPv4 address (or its encoding) may also be cryptographically signed into additional low-order bits of the IPv6 address.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
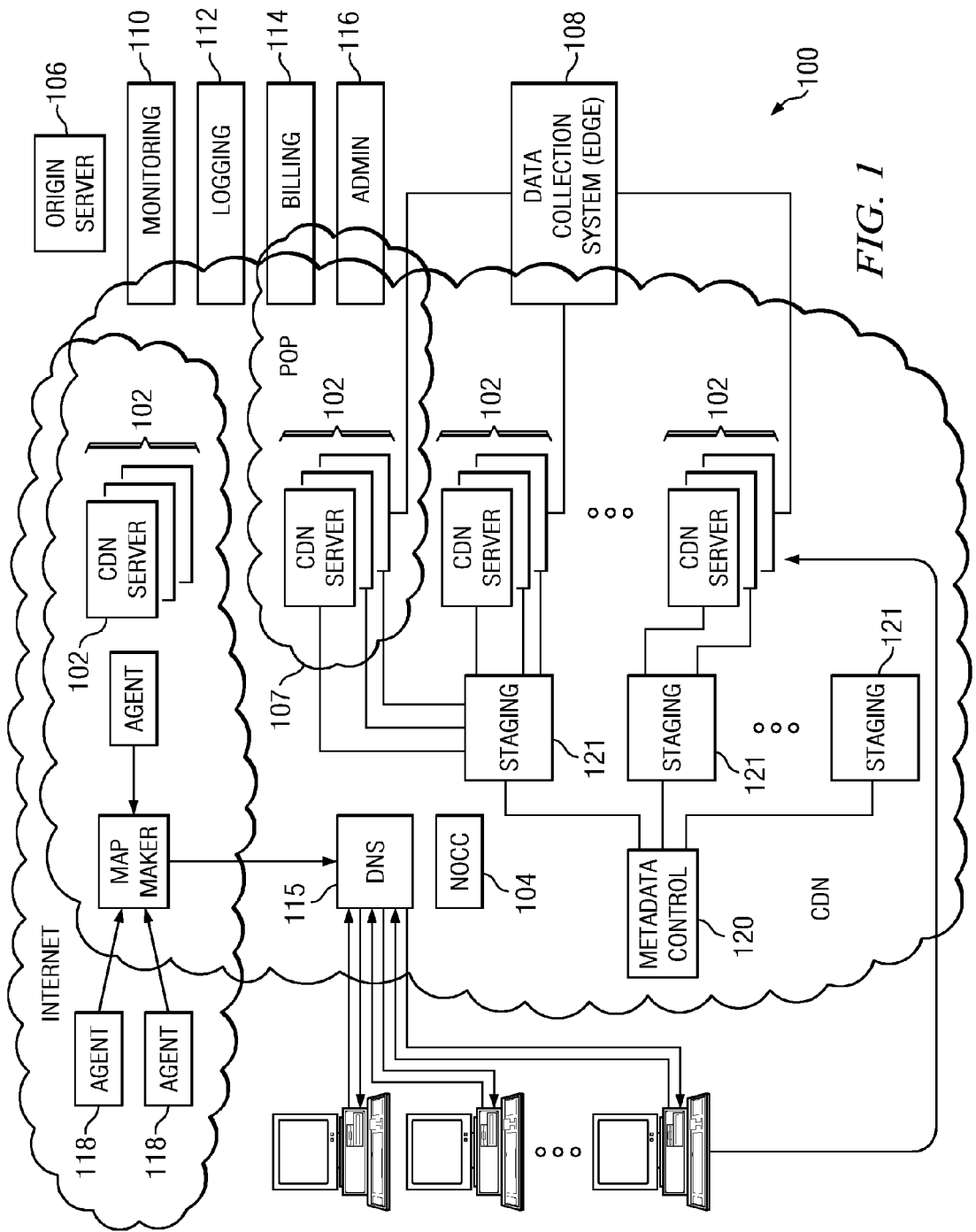
FIG. 1 is a block diagram illustrating a known distributed computer system configured as a content delivery network (CDN)

FIG. 1 illustrates a known distributed computer system in which the techniques described herein may be implemented. In this representative embodiment, a distributed computer system 100 is configured as a content delivery network (CDN) and is assumed to have a set of machines 102*a-n* distributed around the Internet. Typically, most of the machines are servers located near the edge of the Internet, i.e., at or adjacent end user access networks. A network operations command center (NOCC) 104 may be used to administer and manage operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
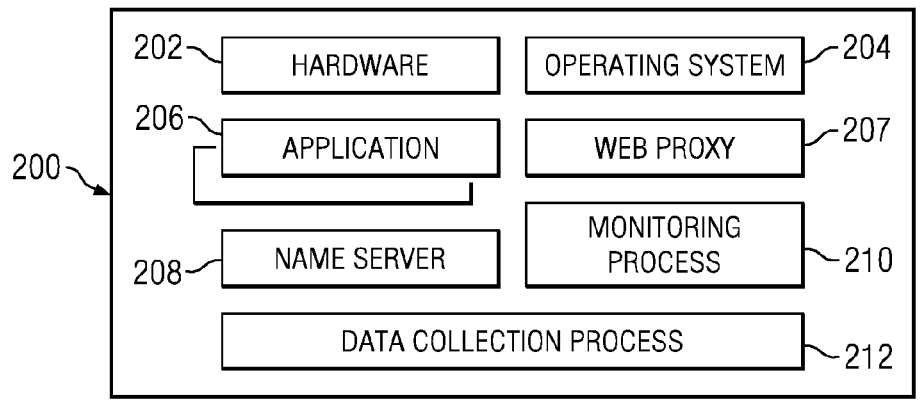
FIG. 2 is a representative CDN machine.

As illustrated in FIG. 2, a given machine 200 in the CDN comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP web proxy 207, a name server 208, a local monitoring process 210, a distributed data collection process 212, and the like. For streaming media, the machine typically includes one or more media servers, such as a Windows Media Server (WMS) or Flash 2.0 server, as required by the supported media formats. When configured as a CDN "edge" server, the machine shown in FIG. 2 may be configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

As is well-known, DNS is the standard Internet service responsible for translating domain names into IP addresses. Generally, an entity is considered "authoritative" for the domains it owns. This means the entity controls the responses that its DNS servers (the authoritative servers) provide when DNS information is requested. Normally, this means the authoritative server responds with the IP address of the server associated with a particular domain. The IP address defined in the authoritative name server is known as an Address or an "A" record. To use a content delivery network (CDN) service such as described above, a content provider's name server typically is modified to return (to a requesting client name server) a CNAME record, which points to a CDN service provider domain. This means a CNAME is returned by the content provider's name server, instead of an "A" record that points to the IP address of the content provider's Web server. In aliasing a site to the CDN in this manner, the content provider allows the CDN service provider to deliver the content for that domain to its end-users. The CDN name servers respond with the IP address of a CDN edge server, which then delivers the content to the end-user on behalf of the content provider.

In a typical DNS, a "resolver" is a client program that is responsible for querying name servers to find the IP address for a given domain.

In one known approach, name servers for CDN edge networks use a 2-tier approach wherein top levels provide delegations to low levels.

As used herein, the following terms have the following meanings:

CCNS refers to a "client caching name server." This is a nameserver to which end user resolvers make requests and which provides recursively resolved answers. CCNSs make iterative DNS queries to authoritative nameservers on behalf of end-users and typically cache the results.

GTLD refers to Generic Top Level Domain. These are the authorities for single component domains, such as ".net" or ".com".

"Authorities" or "authoritative nameservers" refers to nameservers that provide authoritative answers for zones, for which they get delegated to by the parent zone's authorities (e.g. .com delegating akamai.com to akamai.com authorities). These nameservers will eventually be queried by CCNS to resolve end-user queries, and they are typically non-recursive.

Familiarity with IPv6 is assumed. Further information can be found in the following Internet RFCs: 2460, 2464, 3041, 3056, 3513, 3596, 3964, 4193, 4291, 4443, 4861 and 4862. Entities that speak IPv6 use IPv6 transit and live on machines with v6 service addresses. Their connections are routed over the IPv6 Internet (although possibly tunneled through v4). Entities that understand AAAA records understand there is IPv6, but they may not be able to (or need to) communicate over it themselves. The choice of whether (or what) to respond to a given DNS request is independent from the protocol that a given CCNS uses to communicate with an authoritative name server.

By way of brief background, IPv6 addresses are usually written as eight groups of four hexadecimal digits. If one or more four-digit group(s) is 0000, the zeros may be omitted and replaced with two colons. Having more than one double-colon abbreviation in an address is not permitted. In a URL, the IPv6 address is enclosed in brackets. The top 64 bits of an IPv6 address are intended to be a network prefix, and the bottom 64 bits typically are the host. Any IPv4 address has a corresponding IPv6 address. It is formed from a special prefix of IPv6 address space (::ffff:0:0/96) followed by the value of the IPv4 address. Although all IPv4 addresses can be represented with an IPv6 address, there is no connectivity implied (between a v4-only and a v6-only machine). As noted above, DNS has a new resource record, called a quad-A (AAAA) record, for looking up an IPv6 address. DNS lookups for IPv6 address can be performed over IPv4.

A representative CCNS is a dual stack machine that has both IPv4 and IPv6 connectivity. Typically, the CCNS is implemented as software, i.e., computer program instructions executed by a processor. As implemented in a computer memory, the CCNS is tangible and non-transitory. As used herein, a "dual stack" means that the CCNS includes first instructions (processor-executable) that facilitate IPv4 connectivity, as well as second instructions (also processor-executable) that facilitate IPv6 connectivity. Typically, a dual-stack machine includes at least one CPU, which can be used to process both the IPv4 and IPv6 functionality. In the alternative, a single stack machine with more than one CPU can process either type of request from any CPU within the machine. A CCNS capable of speaking over IPv6 is assumed to also have some facility available for contacting nameservers over IPv4. The CCNS is expected to resolve names provided to it by end users. As the authorities for any given zone might include IPv4 nameservers, the CCNS must be able to direct DNS requests at those v4 authorities (even when asking about them over v6). Thus, as used herein, a CCNS is a nameserver that is capable of operating over both IPv4 and IPv6 and may try to contact other nameservers over either protocol, typically depending on the responses it receives and perhaps local configuration.

If a delegation to some organization's zone only includes nameservers with IPv4 addresses, the CCNS is forced to follow the delegation to the organization's nameservers over IPv4. When the CCNS makes the DNS request against the organization's authoritative nameservers, those nameservers can return delegation records to a sub-zone, and, as described herein, those delegations must include at least one nameserver that supports IPv6 addressing. In other words, the organization's first set of nameservers need not support IPv6 while at least one delegated-to nameserver does support IPv6.

According to the teachings herein, an IPv6 authoritative nameserver is provided with the capability of discovering the IPv4 address of client caching nameservers that also operate on IPv6. The IPv6 authoritative nameserver is implemented as software, namely, as a set of processor-executable instructions, typically stored in computer memory (a tangible, non-transitory medium). As noted above, for purposes of this disclosure, it is assumed that an IPv6 CCNS (that communicates with the authoritative nameserver over the DNS protocol) is a dual stack machines also running IPv4. Until the IPv6 Internet is ubiquitous, an authoritative nameserver will still be answering (A) requests for v4-content. Thus, the "right" answer to an A-request from a v6 CCNS is the same answer that should be provided from the authoritative nameserver back to the CCNS if the request came in over v4. Where mapping is based on DNS request source IP, the IPv6 nameserver needs to obtain a correlation between the v4 and v6 addresses of a dual stack CCNS and use that correlation to hand back an appropriate answer. The v4-v6 correlation enables the IPv6 authoritative nameserver to respond correctly to requests sent over IPv6, and it further provides a basis for understanding the topology of the IPv6 Internet.

According to this disclosure, the CCNS IPv4-IPv6 correlation is obtained as follows. When an authoritative nameserver returns a quad-A (AAAA) record for an authority, preferably it embeds the v4 IP address of the requesting CCNS in the low order bits of the IPv6 name server address to which it delegates. The authoritative nameserver "knows" the IPv4 address of the CCNS because the request is being made over IPv4. The encoding may be performed in one of several ways, such as placing the 32 bit IPv4 address unmodified in the lowest 32 bits of the IPv6 address, encrypting the IPv4 address in the low-order bits of the IPv6 address (using as many bits as desired), cryptographically hashing the IPv4 address into the low-order bits of the IPv6 address (using as many bits as desired), or in any other convenient manner. Regardless of whether the IPv4 address is unmodified, encrypted or hashed, it may also be desired to digitally sign either the IPv4 address or its encoding into additional low-order bits of the IPv6 address. For example, and without limitation, the resulting 128 bit IPv6 nameserver address could be composed (as a concatenation from high-order to low-order bits) as follows: bits 64-127 (IPv6 address space routed to a single IPv6-capable nameserver) |bits 32-63 (cryptographic signature of the CCNS IPv4 address)|bits 0-31 (IPv4 address of the CCNS).

Figure 3:
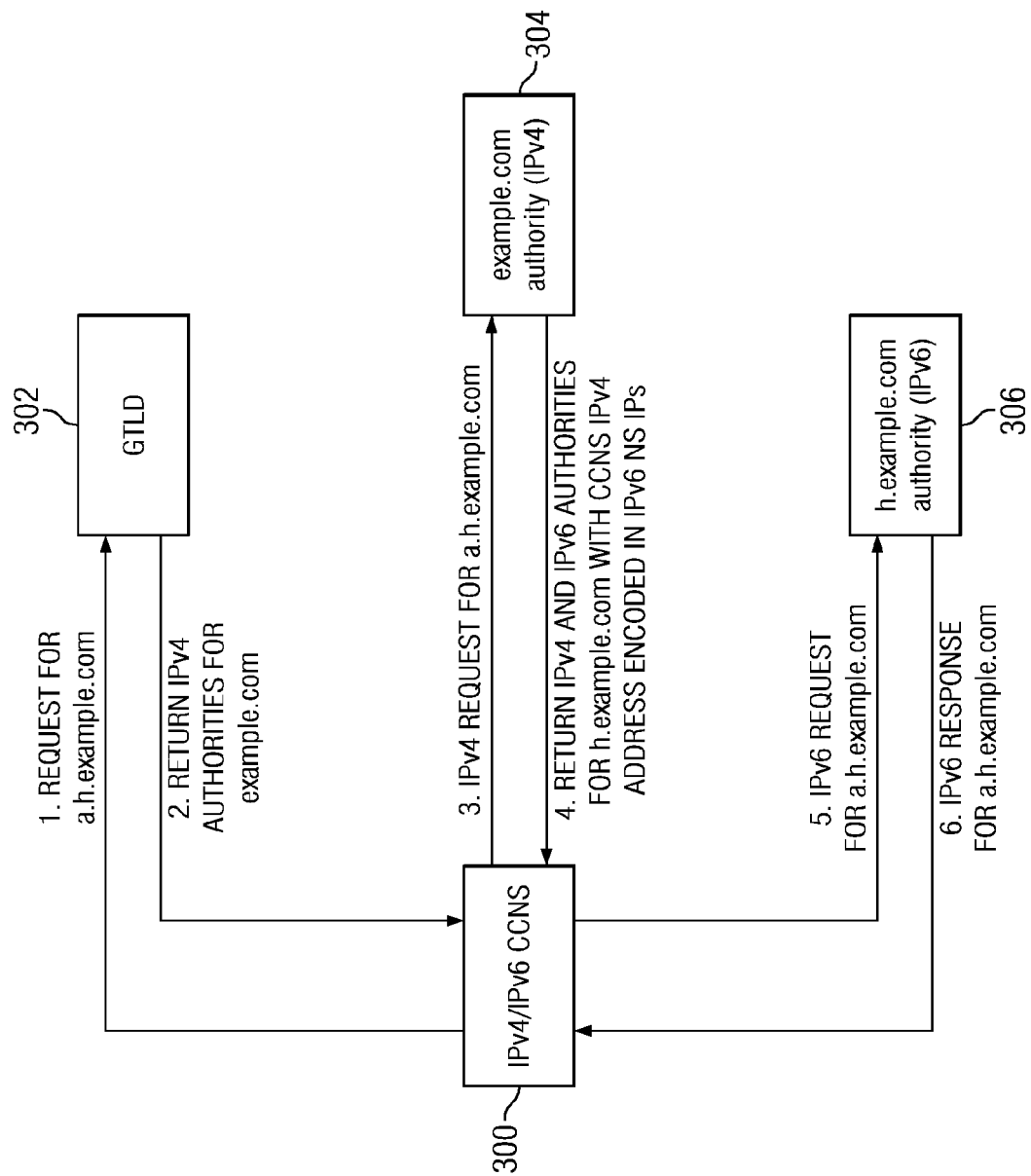
FIG. 3 illustrates a technique for IPv4 address encoding and detection according to the teachings herein.

FIG. 3 illustrates how an organization can determine the IPv4 address of IPv6 CCNSs that contact it. In this example, CCNS 300 is a dual-stack machine. GTLD 302 represents the global top level domain, reference numeral 304 represents an authority for the organization (e.g., "example.com") that operates over IPv4, and reference numeral 306 is an authority for a sub-domain (e.g., "h.example.com") that operates over IPv6.

At step 1, the CCNS 300 attempts to look up a.h.example.com by first asking the GTLD 302 over IPv4 or IPv6. The query is as follows:

{CCNS}→{GTLD} Q a.h.example.com IN A

At step 2, the GTLD 302 answers with the authority and additional records for example.com, which are all IPv4 nameservers (in this scenario):

{GTLD}→{CCNS} AUTH example.com. IN NS
  ns1.example.com
  ADDL ns1.example.net. IN A {ns1}

At step 3, the CCNS 300 attempts to lookup a.h.example.com by asking of example.com's IPv4 authoritative nameservers:

v4 {CCNS}→{ns1} Q a.h.example.com IN A

At step 4, the authoritative nameservers for example.com return a delegation to authorities for h.example.com. In this scenario, some of the authorities are IPv4 servers and some are IPv6 servers. As described above, preferably the IPv6 server addresses contain the CCNS's IPv4 address and a cryptographic signature of the same in the lower bits, represented here as "CCNSDATA":

v4 {ns1}, {CCNS} AUTH h.example.com. IN NS
  ns2.h.example.com
  h.example.com. IN NS ns4.h.example.com
  ADLL ns2.h.example.com IN A {ns2}
  ns4.h.example.com IN AAAA {ns4::CCNSDATA}

At step 5, if the CCNS 300 speaks IPv6, it will lookup a.h.example.com against the IPv6 authorities provided, contacting them on their specially constructed address:

v6 {CCNS}→{ns4::CCNSDATA} Q a.h.example.com IN A

At step 6, the IPv6 authority for a.h.example.com now knows both the IPv4 and IPv6 address of the CCNS based on the encoded information and the source IP address of the IPv6 packet used to make the DNS request. The server may then use this information in making its response to the CCNS (but it need not do so). The answer may be any typical DNS answer, such as an (A) record, an (AAAA) record, a CNAME record, or the like:

v6 {ns4::CCNSDATA}→{CCNS} ANS a.h.example.com IN A 10.0.0.1

Figure 4:
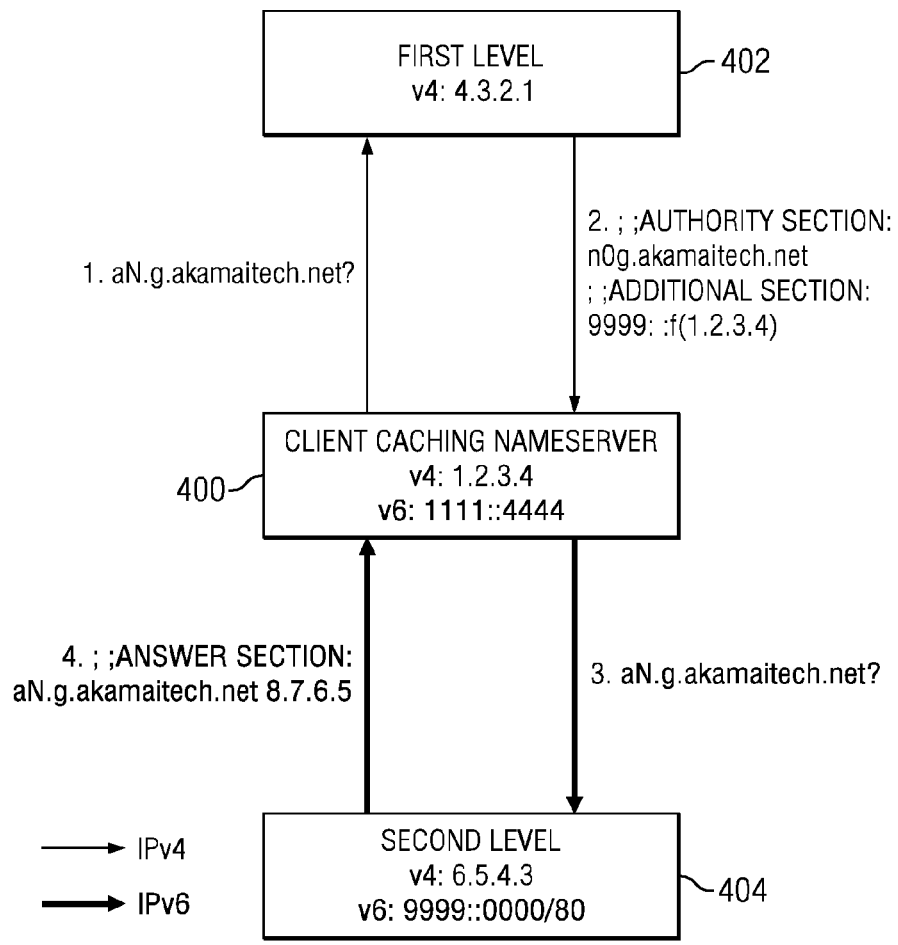
FIG. 4 illustrates a more specific example of the disclosed technique in the context of a CDN name service having a first level nameserver that receives IPv4 requests, and a second level nameserver that handles both IPv4 and IPv6 requests.

FIG. 4 illustrates a more concrete example in a content delivery network (CDN) that operates a multi-tiered approach wherein first level nameservers provide delegations second (or next) level nameservers. In this scenario, it is assumed that only IPv4 authorities are listed at the GTLD (not shown). The CCNS 400 is seeking a resolution for the domain aN.g.akamaitech.net. The CCNS 400 IPv4 address is 1.2.3.4, and its IPv6 address is 1111::4444. At step 1, CCNS 400 makes a query to a CDN first level 402 at IPv4 address 4.3.2.1. At step 2, the first level returns the authority and an additional section, the latter including the IPv4 encoding of the CCNS as previously described. At step 3, the CCNS makes an IPv6 request to the authoritative nameserver 404 (also a dual-stack machine) at its IPv6 address 9999::0000/80. The reference to /80 refers to a number of bits of the IPv6 that are relevant. When a request arrives for an (A) record, the nameserver first extracts the v4 IP address of the CCNS and verifies the request is legitimate. If the request passes validity checking, the v4 IP address is used to look up mapping and the second level nameserver responds accordingly, such as illustrated at step 4. (If the packets fails to authenticate, preferably a mapping based on some fixed v4 IP is returned).

The IPv6 capable authoritative nameserver is aware that the low-order (e.g., 48) bits are used to securely embed the IPv4 address. When a request comes in from an IPv6 CCNS, the authoritative name server extracts the v4 IP address from the low order bits of the address the IPv6 CCNS used to contact it. Using the IPv4 address of the CCNS making the request (over IPv6), the authoritative nameserver looks up the answer and responds accordingly. Because the authoritative nameserver is extracting the v4-v6 correlation in the normal course of responding to requests, the nameserver can also write a log file. This information correlates the v4 and v6 IP space. The v4-v6 correlation is maintained in a memory as a data record, a table, an array, a linked list, or other convenient data structure, and the information can be used to give answers to v4 nameservers asking for AAAA records and for v6 nameservers asking for A records.

The above-described technique for learning the association between an end-user client IP address and the IP address of the CCNS that client is using for DNS service. It is assumed that the CCNS supports IPv6, as does a CDN edge server such as shown in FIG. 2. As known in the art, a CDN name service is responsive to a CCNS-supplied CDN hostname and returns (to the requesting client, through the CCNS) an IP address associated with one or more CDN edge servers (typically within a given "region" or set of such servers) that can respond to a subsequent content request issued from that requesting client. When the requesting client then makes a request to the IP address associated with the CDN edge server, it also passes its own IP address. Thus, if the IPv6 address of the CCNS is encoded in the response address issued by the CDN name service, and if the CDN edge server uses IPv6, the CDN edge server can link up the client IP with the CCNS IP (that initially contacted the CDN name service), which provides a client/CCNS association. This association may be saved for future use (e.g., traffic management decisions, analysis, reporting, or the like).

To enhance security of the above-described embedding scheme, it may be desired to use a shared key accessible to the authoritative IPv6 nameservers. The key may be rotated periodically (e.g., daily) and time-stamped so that top level name servers that delegate to the authoritative nameservers start using the key only after all authoritative nameservers have received it. Preferably, the authoritative nameserver maintains the current key and a previous key so that is can decode correctly during a key transition.

While the above-described correlation technique has been described in the context of a specific type of DNS request (e.g., for an A record in IPv4, or for an AAAA record in IPv6), this is not a limitation. The technique can be performed for any type of request (e.g., NS, SOA, PTR, MX, TXT, etc.), as the delegated authorities for a zone must be able to answer any name for that zone.

Moreover, while the above-described technique is described in the context of an authoritative nameserver that maps (a DNS query to IP address) based on DNS request source IP, the technique may be implemented on or in association with a nameserver that maps without resort to source IP data. Thus, the correlation technique is not limited for use with any particular type of mapping system or functionality.

Further, while in a preferred embodiment a first level authority is IPv4-based and returns both IPv4 and IPv6 authorities as the delegated zone authorities, this is not a limitation, as the first level authority may return only IPv6 authorities. Thus, more generally, the first level authority returns at least one IPv6 authority and any number (zero or more) IPv4 authorities.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described name server methods. The machine also includes data in the form of authority sets.

While given components of the system have been described separately, one of ordinary skill will appreciate that some of the functions may be combined or shared in given instructions, program sequences, code portions, and the like.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

Having described our invention, what we claim is as follows:

The invention claimed is:

1. A method, comprising:
in response to receipt at a first level authority of a first request for a domain, the first level authority operative within a nameserver hierarchy, the first request including an IPv4 source address of a caching nameserver making the first request, returning to the caching nameserver information identifying at least an IPv6 authority and zero or more IPv4 authorities, where the IPv4 source address of the caching nameserver is encoded in an IPv6 address of the IPv6 authority;

receiving, at the IPv6 authority that is a second level authority within the nameserver hierarchy, a second request, the second request having associated therewith an IPv6 address of the caching nameserver that includes the IPv4 source address of the caching nameserver encoded therein; and at the IPv6 authority, saving an association between the IPv4 source address of the caching nameserver and the IPv6 address of the caching nameserver;

wherein the caching nameserver is executed in a dual stack machine that has both IPv4 and IPv6 connectivity, wherein an IPv4 authority is executed in one stack, and an IPv6 authority is executed in a second stack.

2. The method as described in claim 1 further including the IPv6 authority responding to the second request.

3. The method as described in claim 2 further including the IPv6 authority verifying the second request prior to responding to the second request.

4. The method as described in claim 1 wherein the first request is a request for an (A) record.

5. The method as described in claim 3 wherein the second request is a request for an (AAAA) record.

6. The method as described in claim 1 wherein the IPv4 source address of the CCNS is encoded by placing a 32 bit IPv4 address unmodified in the lowest 32 bits of the IPv6 address.

7. The method as described in claim 1 wherein the IPv4 source address of the CCNS is encoded by encrypting the IPv4 address in low-order bits of the IPv6 address.

8. The method as described in claim 1 wherein the IPv4 source address of the CCNS is encoded by cryptographically hashing the IPv4 address into low-order bits of the IPv6 address.

9. The method as described in claim 1 wherein the IPv6 address of at least one of the IPv6 authorities also includes a digital signature of the IPv4 address or an encoding of the IPv4 address.

10. An article comprising a non-transitory machine readable medium that stores a program, the program being executed to perform a set of operations comprising:

in response to receipt at a first level authority of a first request for a domain, the first level authority operative within a nameserver hierarchy, the first request including an IPv4 source address of a caching nameserver making the first request, returning to the caching nameserver information identifying at least an IPv6 authority and zero or more IPv4 authorities, where the IPv4 source address of the caching nameserver is encoded in an IPv6 address of the IPv6 authority;

receiving, at the IPv6 authority that is a second level authority within the nameserver hierarchy, a second request, the second request having associated therewith an IPv6 address of the caching nameserver that includes the IPv4 source address of the caching nameserver encoded therein; and at the IPv6 authority, saving an association between the IPv4 source address of the caching nameserver and the IPv6 address of the caching nameserver;

wherein the caching nameserver is executed in a dual stack machine that has both IPv4 and IPv6 connectivity, wherein an IPv4 authority is executed in one stack, and an IPv6 authority is executed in a second stack.

11. Apparatus, comprising:

a processor; and computer memory holding computer program instructions executed by the processor, the computer program instructions comprising program code configured to:

in response to receipt at a first level authority of a first request for a domain, the first level authority operative within a nameserver hierarchy, the first request including an IPv4 source address of a caching nameserver making the first request, return to the caching nameserver information identifying at least an IPv6 authority and zero or more IPv4 authorities, where the IPv4 source address of the caching nameserver is encoded in an IPv6 address of the IPv6 authority;

receive, at the IPv6 authority that is a second level authority within the nameserver hierarchy, a second request, the second request having associated therewith an IPv6 address of the caching nameserver that includes the IPv4 source address of the caching nameserver encoded therein; and at the IPv6 authority, save an association between the IPv4 source address of the caching nameserver and the IPv6 address of the caching nameserver;

wherein the apparatus is a dual stack machine that has both IPv4 and IPv6 connectivity, wherein an IPv4 authority of the caching nameserver is executed in one stack, and an IPv6 authority of the caching nameserver is executed in a second stack.

* * * * *